United States Patent
Wu

(10) Patent No.: US 7,297,001 B2
(45) Date of Patent: *Nov. 20, 2007

(54) WIRE WINDING DEVICE WITH TRANSMISSION LINE WHICH ARE PULLED AT ONE END

(76) Inventor: Sung Chiang Wu, 235 Chung-Ho Box 8-24, Taipei (TW)

( * ) Notice: Subject to any disclaimer, the term of this patent is extended or adjusted under 35 U.S.C. 154(b) by 225 days.

This patent is subject to a terminal disclaimer.

(21) Appl. No.: 11/146,260

(22) Filed: Jun. 7, 2005

(65) Prior Publication Data

US 2006/0214044 A1    Sep. 28, 2006

(30) Foreign Application Priority Data

Mar. 22, 2005  (CN) .................. 2005 2 0084145

(51) Int. Cl.
*H01R 39/00*        (2006.01)

(52) U.S. Cl. ......................................... 439/4

(58) Field of Classification Search .............. 439/4, 439/501
See application file for complete search history.

(56) References Cited

U.S. PATENT DOCUMENTS

| 5,422,957 | A  | * | 6/1995  | Cummins ................... 381/384 |
| 6,287,141 | B1 | * | 9/2001  | Hsieh Huang .............. 439/501 |
| 6,416,355 | B1 | * | 7/2002  | Liao ........................... 439/501 |
| 6,733,328 | B2 | * | 5/2004  | Lin et al. .................... 439/501 |
| 6,834,620 | B2 | * | 12/2004 | Albers, Jr. .................. 119/740 |
| 6,851,530 | B2 | * | 2/2005  | Wei ........................ 191/12.2 R |
| 6,866,219 | B2 | * | 3/2005  | Wei ........................ 242/378.4 |
| 7,001,210 | B1 | * | 2/2006  | Chiang ....................... 439/501 |
| 7,052,281 | B1 | * | 5/2006  | Meyberg et al. ............... 439/4 |
| 2003/0211774 | A1 | * | 11/2003 | Tsai ........................... 439/501 |

* cited by examiner

Primary Examiner—Tulsidas C. Patel
Assistant Examiner—Phuongchi Nguyen

(57) ABSTRACT

A wire winding device with transmission line is pulled at one end. The retaining end module and the telescopic end module are fixed together. The transmission line of the transmission line can be received in the spacing layer. In use only one end of the transmission line is pulled out. The transmission line will can be arranged orderly. The wire winding device has the function of adjusting the length of the earphone at any time without affecting the data reading or playing. Thereby the transmission line can be connected to various devices, such as earphones, USB connectors or signal connectors, to be connected to various electronic devices, such as computers, and mobile phones, etc. Thereby structure is simple and can be operated easily.

8 Claims, 7 Drawing Sheets

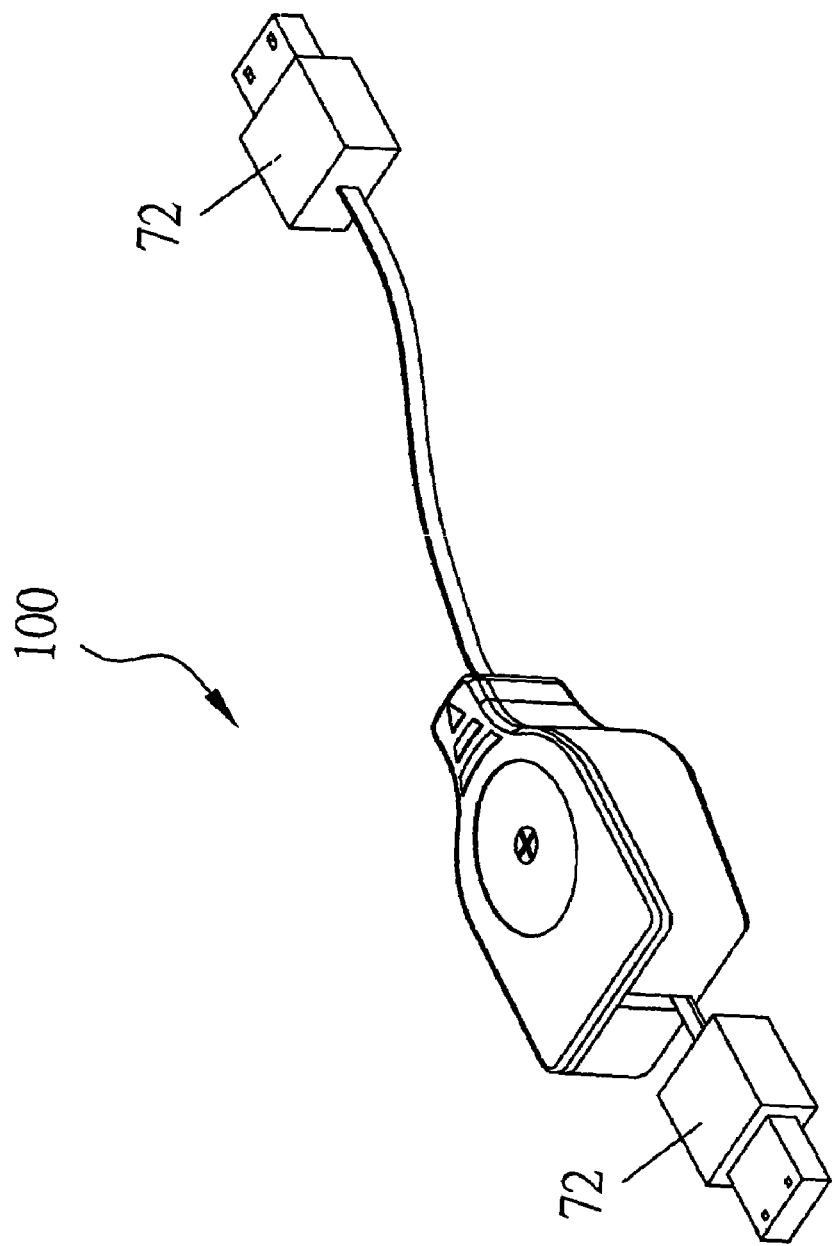

WIRE WINDING DEVICE WITH TRANSMISSION LINE WHICH ARE PULLED AT ONE END

FIELD OF THE INVENTION

The present invention relates to wire winding devices, and in particular to a wire winding device with transmission line which are pulled at one end.

BACKGROUND OF THE INVENTION

In the prior art, wire in the wire winding box is pulled from two ends at the same time and thus the operation is inconvenient. Furthermore, the transmission line is long so that it is possible to be arranged disorderly. Furthermore, the length of the transmission line cannot be adjusted in time. Moreover the cost of the prior art wire winding device is high. Thereby it is necessary to be improved.

SUMMARY OF THE INVENTION

Accordingly, the primary object of the present invention is to provide a wire winding device with transmission line which are pulled at one end, wherein the retaining end module and the telescopic end module are fixed together. The transmission line can be received in the spacing layer. In use only one end of the transmission line is pulled out. The transmission line will can be arranged orderly.

Furthermore, another object of the present invention is to provide a wire winding device, wherein the wire winding device of the present invention has the function of adjusting the length of the earphone at any time without affecting the data reading or playing.

Thereby the transmission line can be connected to various devices, such as earphones, USB connectors or signal connectors, to be connected to various electronic devices, such as computers, and mobile phones, etc. Thereby structure of the present invention is simple and can be operated easily.

To achieve above object, the present invention provides a wire winding device with transmission line which are pulled at one end. The device comprises a lower cover; a position sheet being movably installed to the lower cover; a front end of the position sheet having a block; a front end of the position sheet being bent toward the lower cover; a rotary base; a top of the rotary base having an annular track and a lower side thereof having a groove; a lateral side of the rotary base being a spacing layer for winding a transmission line; a block being firmly and movably embedded into an annular track of the rotary base; and the rotary base having a spacer; a spiral spring received in the groove of the rotary base; the spacer serving to cover the spiral spring into the groove of the rotary base; a telescopic end module having a circuit board which is connected to a transmission line; the circuit board being installed below the rotary base; a bottom of the circuit board having a plurality of annular joints; a retaining end module having a functional circuit board installed at a bottom of the circuit board; a center of the functional circuit board having a plurality of retaining holes; a top of the retaining end module having a plurality of electric joints so that the electric joints are in contact with the annular joints so that signals are transmitted; the functional circuit board being extended with a transmission line; and an upper cover; a center of the upper cover being extended with a holed post; one side of the post having a notch for fixing the spiral spring. Screws are locked into the holed post, the position sheet, rotary base, spiral spring, telescopic end module, retaining end module are fixed to the upper cover.

BRIEF DESCRIPTION OF THE DRAWINGS

FIG. 7 shows the third application of the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
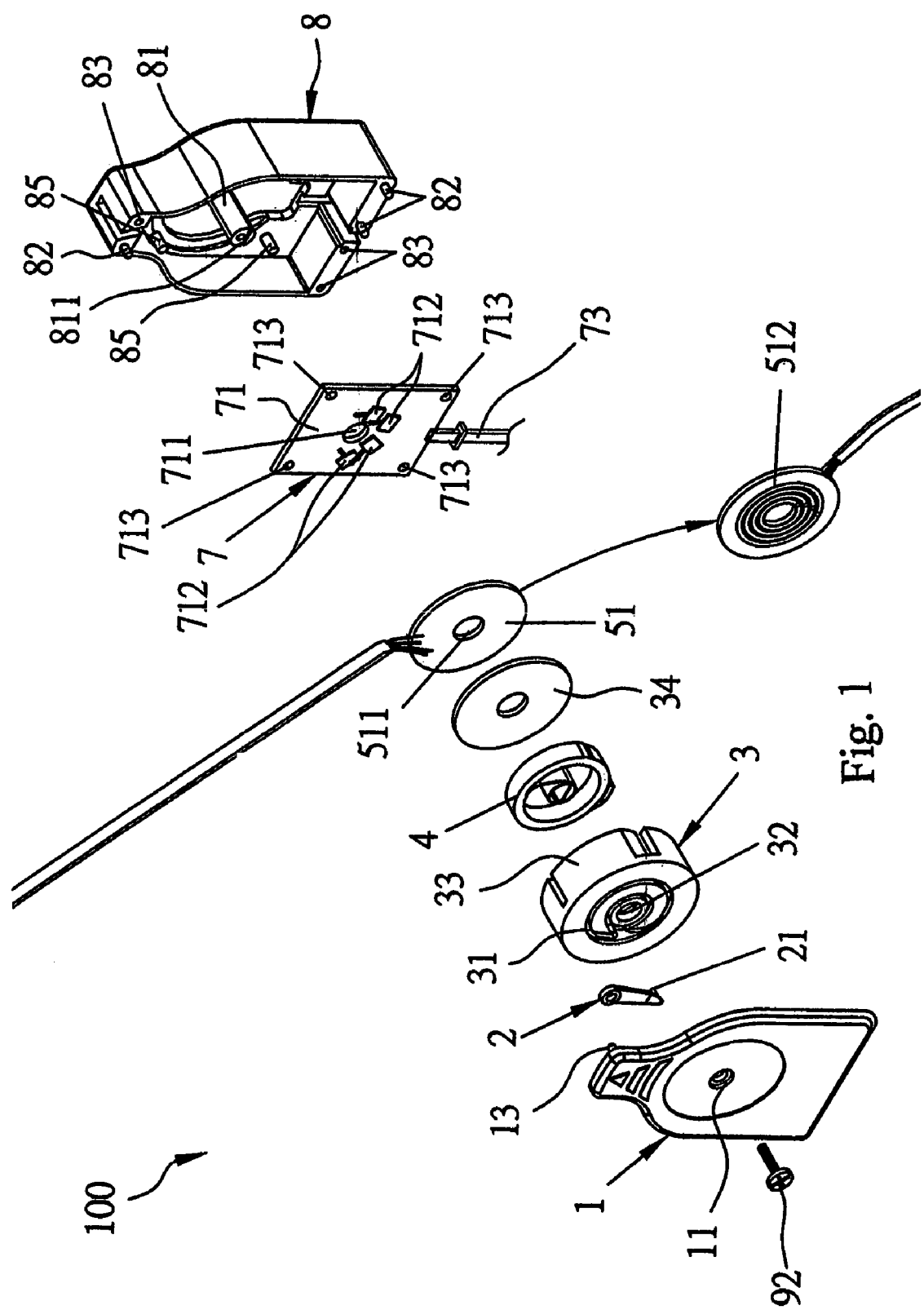
FIG. 1 is an exploded schematic view of the present invention.
Figure 2:
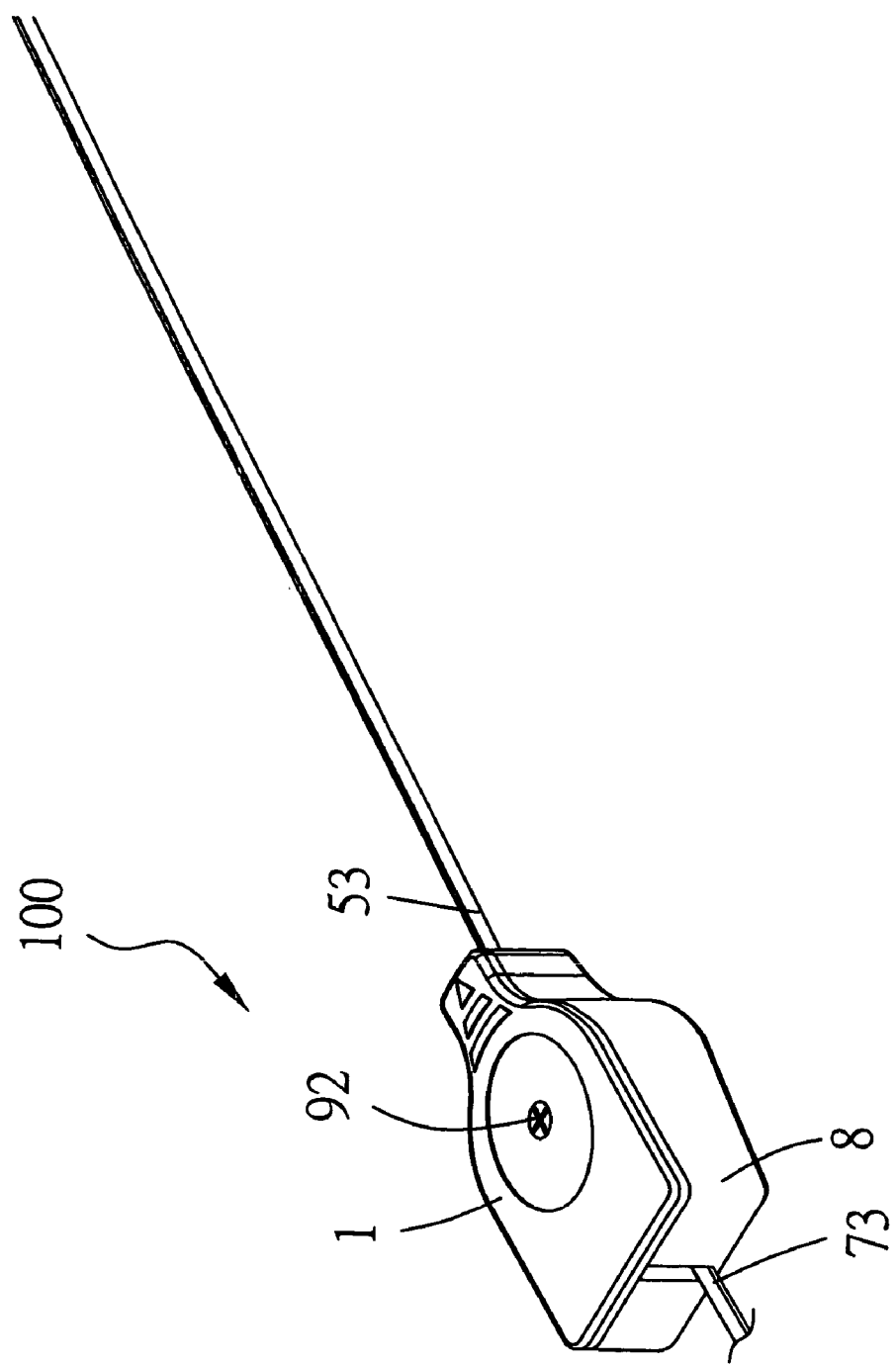
FIG. 2 is schematic view of the present invention.

With reference to FIGS. 1, and 2, the present invention is illustrated. The present invention comprises the following elements.

A lower cover 1 has a via hole 11 at a center portion thereof.

A position sheet 2 is movably installed at a bottom of the lower cover 1. A front end of the position sheet 2 has a block 21. A front end of the position sheet 2 is bent toward the lower cover 1.

A top of the rotary base 3 has an annular track 31 and a lower side thereof has a groove 3. A lateral side of the rotary base 3 is a spacing layer 33 for winding a transmission line 53. A block 21 is firmly and movably embedded into an annular track 31 of the rotary base 3. A center of the rotary base 3 has a via hole 32. The rotary base 3 has a spacer 34.

A spiral spring 4 is received in the groove of the rotary base 3. The spacer 34 serves to cover the spiral spring 4 into the groove of the rotary base 3.

A telescopic end module 5 has a circuit board 51 which is connected to a transmission line 53. The circuit board 51 is installed below the rotary base 3. A center of the circuit board 51 has a via hole 511. A bottom of the circuit board 51 has four annular joints 512.

A retaining end module 7 has a functional circuit board 71 installed at a bottom of the circuit board 51. A center of the functional circuit board 71 has a via hole 711 and four retaining holes 713. A top of the retaining end module 7 has a plurality of electric joints 712 so that the electric joints 712 are in contact with the annular joints 512 and thus signals are transmitted between two circuit boards. The functional circuit board 71 is extended with a transmission line 73.

A center of the upper cover 8 is extended with a holed post 81. One side of the post 81 has a notch 811 for fixing the spiral spring 4. Each of four ends of the upper cover 8 is installed with a post 85 for embedding into the retaining hole 713 of the functional circuit board 71. The lower end of the upper cover 8 has two posts 82 and two recesses 83 for fixing with the lower cover 1. Screws 92 are locked into the holed post 81, the position sheet 2, rotary base 3, spiral spring 4, telescopic end module 5, retaining end module 7 so that they are fixed to the upper cover 8. By assembling the upper cover 8 and lower cover 1, posts 13, 82 and recess 83, the present invention is formed.

Figure 3:
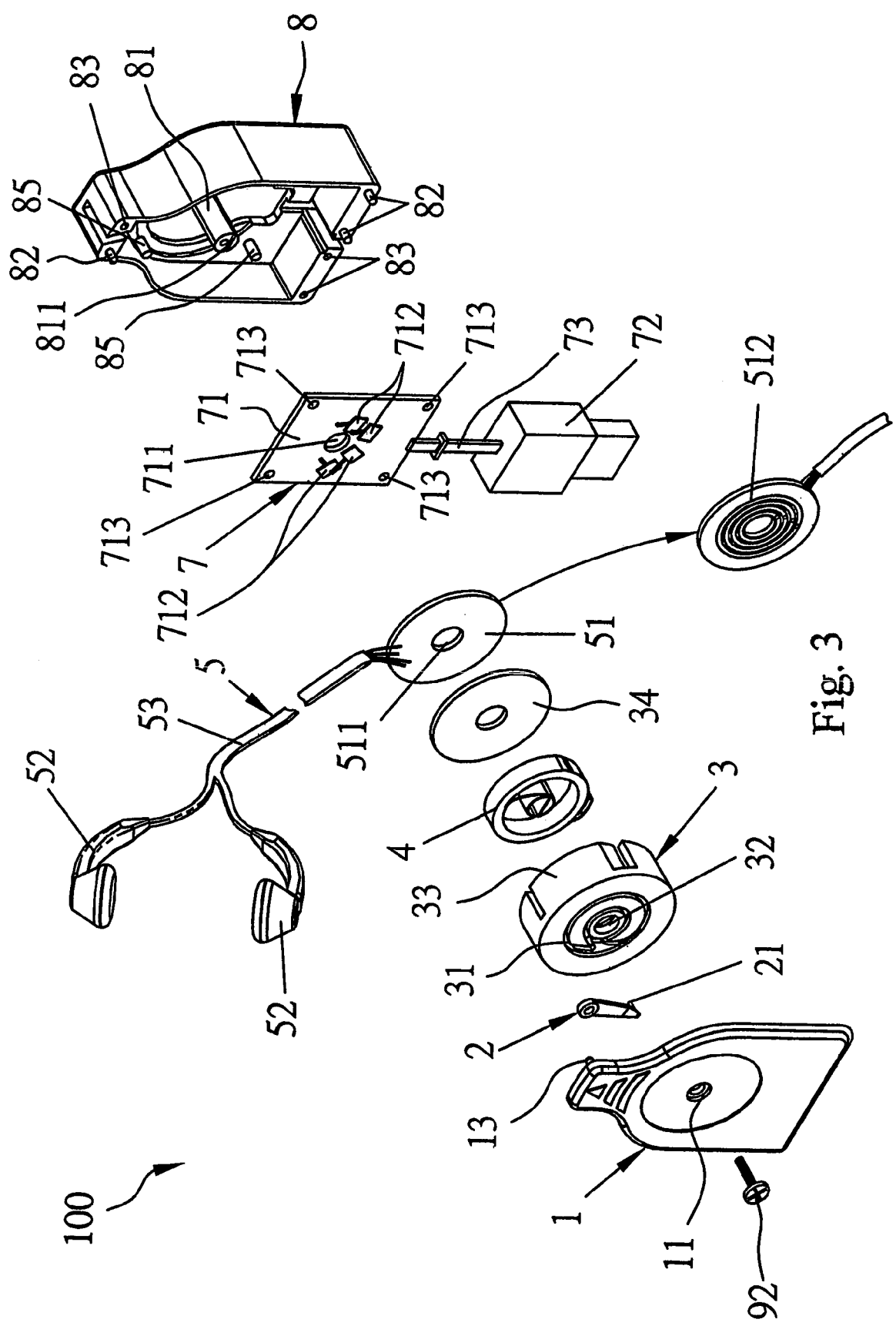
FIG. 3 shows the exploded perspective view of the second embodiment of the present invention.
Figure 4:
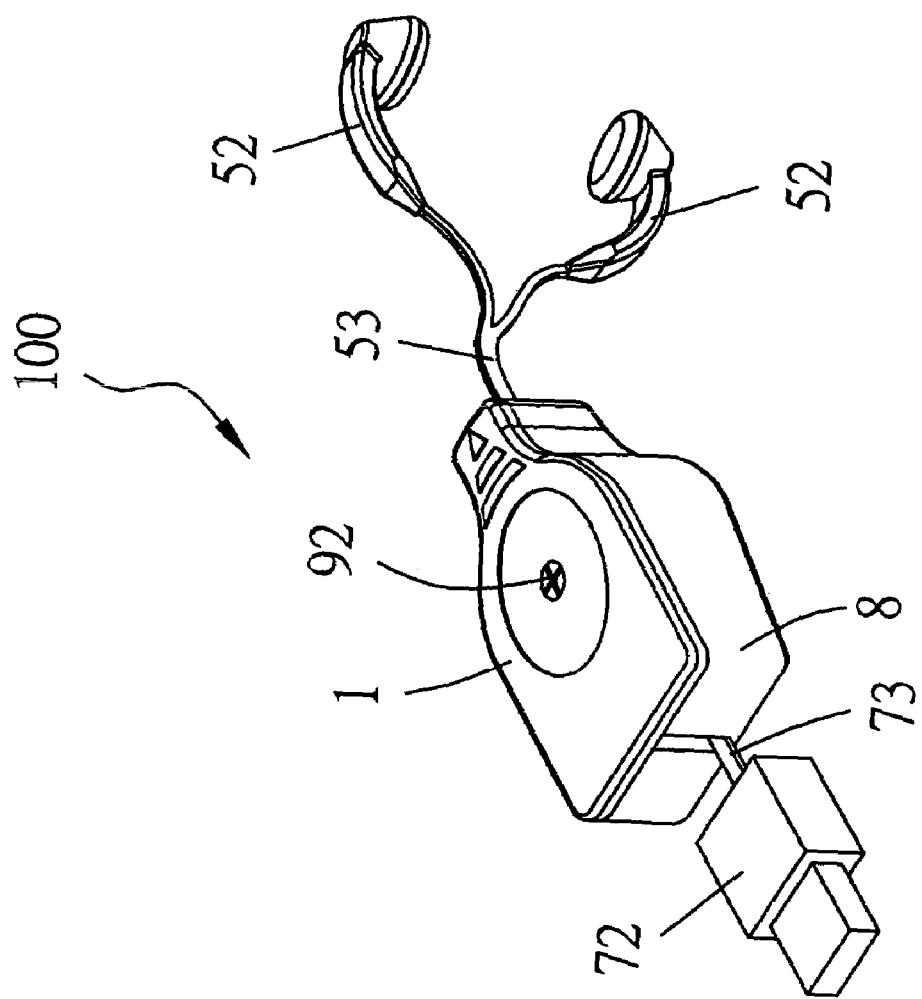
FIG. 4 shows the schematic view about the second embodiment of the present invention.

Referring to FIGS. 3 and 4, another embodiment 100 of the present invention is illustrated. Those identical to the above first embodiment will not be described herein. Only the differences of the two are described. It is illustrated that an earphone transmission line 53 is connected to the circuit board 51 and two earphones 52 are connected to the earphone transmission line 53. Thereby the transmission line 73 extended from the circuit board of the functional circuit board 71 is connected to a USB connector 72.

Figure 5:
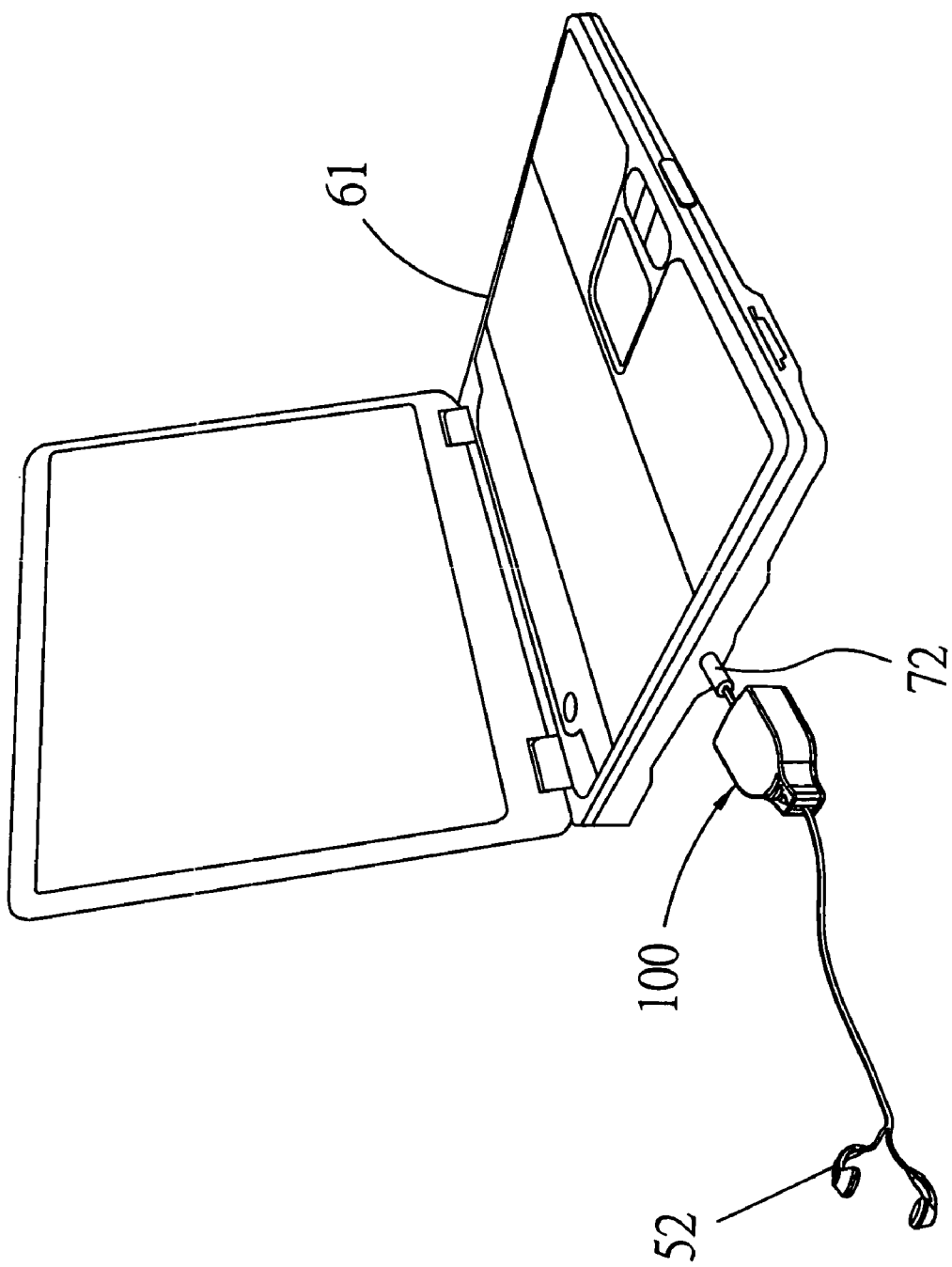
FIG. 5 shows the first application of the present invention.
Figure 6:
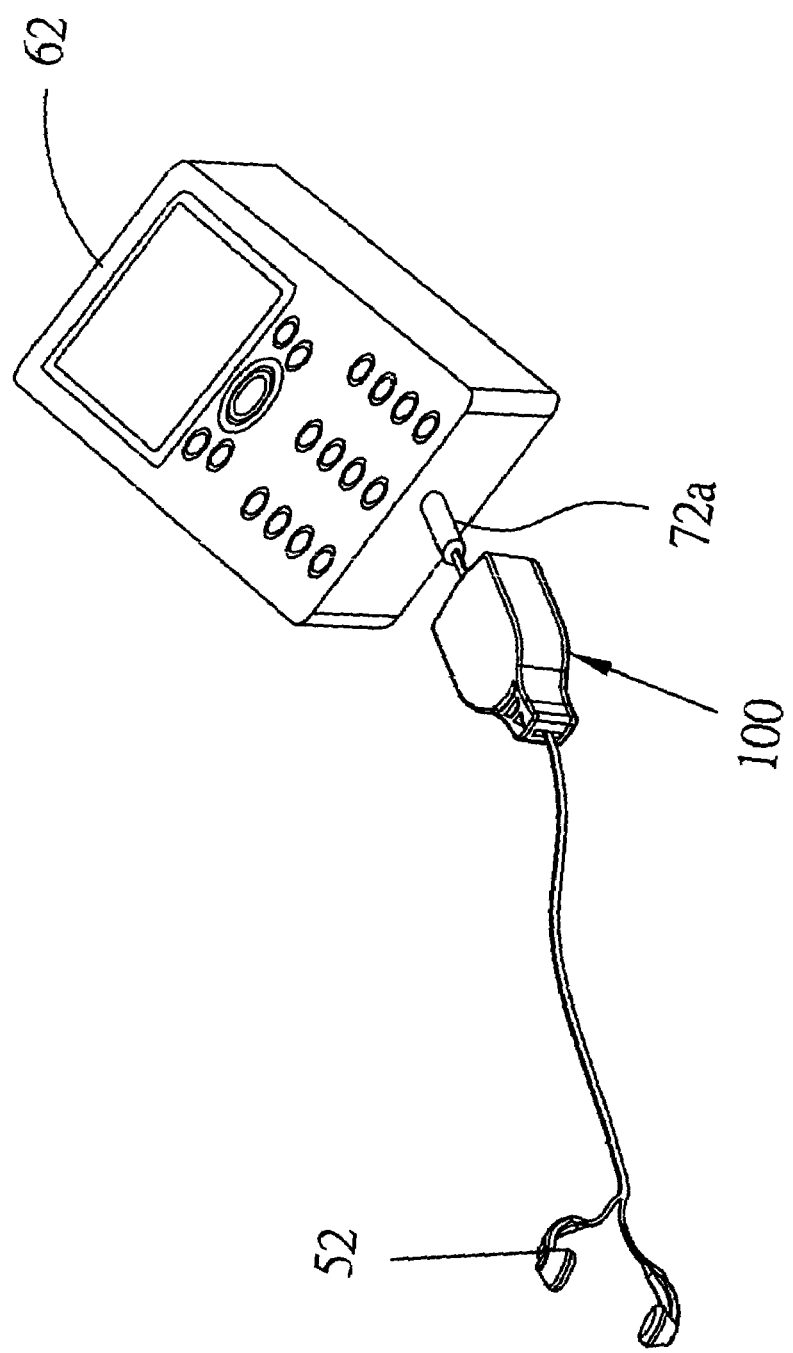
FIG. 6 shows the second application of the present invention.

Referring to FIG. 5, one application of the present invention is illustrated. It is illustrated that the present invention is connected to a computer 61. In FIG. 6, it is illustrated that the present invention is connected to a mobile phone 62. FIG. 7 shows that two ends of the present invention are connected with USB connectors 72.

Advantages of the present invention will be described herein. In the present invention, the retaining end module 7 and the telescopic end module 5 are fixed together. The transmission line of the transmission line can be received in the spacing layer. In use only one end of the transmission line is pulled out. The transmission line will can be arranged orderly.

Furthermore, the wire winding device of the present invention has the function of adjusting the length of the earphone at any time without affecting the data reading or playing. Thereby the transmission line can be connected to various devices, such as earphones, USB connectors or signal connectors, to be connected to various electronic devices, such as computers, and mobile phones, etc. Thereby structure of the present invention is simple and can be operated easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wire winding device with transmission line which are pulled at one end; comprising:
   a lower cover;
   a position sheet being movably installed to the lower cover; a front end of the position sheet having a block and being bent toward the lower cover;
   a rotary base; a top of the rotary base having an annular track and a lower side thereof having a groove; a lateral side of the rotary base being a spacing layer for winding a transmission line; a block being firmly and movably embedded into an annular track of the rotary base; and the rotary base having a spacer;
   a spiral spring received in the groove of the rotary base; the spacer serving to cover the spiral spring into the groove of the rotary base;
   a telescopic end module having a circuit board which is connected to a transmission line; the circuit board being installed below the rotary base; a bottom of the circuit board having a plurality of annular joints;
   a retaining end module having a functional circuit board installed at a bottom of the circuit board; a center of the functional circuit board having a plurality of retaining holes; a top of the retaining end module having a plurality of electric joints so that the electric joints are in contact with the annular joints and the signals are transmitted; the functional circuit board being extended with a transmission line; and
   an upper cover; a center of the upper cover being extended with a holed post; one side of the post having a notch for fixing the spiral spring; and
   wherein screws are locked into the holed post, position sheet, rotary base, spiral spring, telescopic end module, retaining end module so that they are fixed to the upper cover.

2. The wire winding device as claimed in claim 1, wherein the telescopic end module is connected to an earphone module which includes one earphone transmission line and two earphones.

3. The wire winding device as claimed in claim 1, wherein the functional circuit board is connected to a transmission line and then the transmission line is connected to a connector.

4. The wire winding device as claimed in claim 1, wherein the lower cover, rotary base, telescopic end module and retaining end module have via holes at the center thereof the holed posts of the upper cover passes through the via holes so as to fix then to the upper cover.

5. The wire winding device as claimed in claim 1, wherein each of four ends of the upper cover being installed with a post for embedding into the retaining hole of the functional circuit board.

6. The wire winding device as claimed in claim 1, wherein a lower end of the upper cover having posts and recesses for fixing with the lower cover.

7. The wire winding device as claimed in claim 1, wherein the retaining end module is connected to a USB module which is connected to the functional circuit board through a transmission line.

8. The wire winding device as claimed in claim 3, wherein the telescopic end module is connected to a USB connector.

* * * * *